United States Patent [19]

Woolston

[11] 4,004,533

[45] Jan. 25, 1977

[54] SCUTTLING VALVE

[75] Inventor: Lionel L. Woolston, Silver Spring, Md.

[73] Assignee: The United States of America as represented by the Secretary of the Navy, Washington, D.C.

[22] Filed: May 25, 1976

[21] Appl. No.: 689,891

[52] U.S. Cl. .............................. 114/16 E; 9/8 R; 251/325; 137/467; 137/493

[51] Int. Cl.² .................. B63G 8/22; B63B 21/52; F16K 24/04

[58] Field of Search ............ 9/8 R, 9; 114/.5 T, 114/16 E; 251/325; 137/467, 493.2, 493.3, 493; 102/10, 13, 14

[56] References Cited

UNITED STATES PATENTS

| 1,553,395 | 9/1925 | Ressler et al. ............ 137/493.3 X |
| 1,891,119 | 12/1932 | Stover ........................ 137/467 |
| 2,637,862 | 5/1953 | Freas .......................... 9/8 R |
| 2,906,492 | 9/1959 | Conrad ...................... 251/325 |
| 3,326,226 | 6/1967 | Hinton ....................... 9/8 R X |
| 3,947,907 | 4/1976 | Synodis ...................... 9/8 R |

Primary Examiner—Trygve M. Blix
Assistant Examiner—Gregory W. O'Connor
Attorney, Agent, or Firm—R. S. Sciascia; A. L. Branning; F. K. Yee

[57] ABSTRACT

The disclosed valve assembly permits the automatic scuttling, or sinking, of floatable pressure vessels or other containers, and comprises an extensible, spring-restrained nozzle containing a spring-biased ball seal within a flow passage. Vessel internal pressure extends the nozzle from a retracted position to expose the exterior end of the flow passage. A calibrated restraining spring ring maintains the nozzle retracted and in the extended position during pressure vessel operation. The ball seal is displaced from a nonsealing position against a ball seat to preclude pressure relief through the flow passage. After exhaustion of internal pressure, the bias spring and external water pressure force the ball seal from the ball seat to permit water entry and subsequent sinking of the vessel.

12 Claims, 4 Drawing Figures

SCUTTLING VALVE

BACKGROUND OF THE INVENTION

The present invention relates to valves, and more particularly to a valve assembly for controlling the flooding of a pressure vessel.

Flooding, or scuttling, mechanisms are commonly used on marine apparatuses to control the entry of water and the subsequent sinking of the apparatuses. These mechanisms may be employed to control the subsurface mooring of mines a predetermined time after deployment and at a preselected depth, such as described in the Kissinger patent, U.S. Pat. No. 3,696,747 and the U.S. patent to Lyon, U.S. Pat. No. 3,559,580. Scuttling mechanisms may also be employed to sink marine apparatuses such as buoys, decoys and flares after use to remove potential navigational and/or personnel hazards.

The flooding, or scuttling, mechanisms currently used, such as explosive devices, electrolytic plugs and water-soluble plugs, have numerous disadvantages. The explosive devices are dangerous to handle and may necessitate the use of dry cells or other power sources with a limited shelf life. Safety requirements further complicate the logistics involved in the explosive devices, necessitating special handling procedures, the installation of safety-and-arming systems, and separate and special storage facilities. Electrolytic plugs which are consumed by electrolytic decomposition are highly inaccurate since their time delay is dependent upon the salinity, temperature and pressure of the sea water in which they are used. Salt-water soluble tablets share the same disadvantages as the electrolytic plugs and are even more sensitive to the moisture of a marine environment. Thus, electrolytic plugs and soluble tablets require special storage facilities and are not particularly suitable for applications in which the marine apparatus must be in the pre-deployment, ready condition for extended periods exposed to moisture.

The scuttling device described herein provides a means to control the flooding and sinking of a marine apparatus, particularly an apparatus having a self-contained source of pressure, which avoids the deficiencies of the prior art. The present invention provides a simple, reliable, automatic flooding device which is activated only after deployment of the marine apparatus to ensure scuttling thereof.

SUMMARY OF THE INVENTION

Accordingly, it is an object of the invention to provide a new and improved flooding valve assembly.

Another object of the invention is to provide a new and improved flooding valve assembly that is simple in design and reliable in operation.

Another object of the invention is to provide an improved, reliable flooding valve assembly that does not rely on explosive energy, electrolytic action or water solubility for operation.

Yet another object of the invention is to provide an improved, reliable flooding valve assembly particularly suitable for scuttling a pressurized marine apparatus.

Still another object of the invention is to provide a flooding valve assembly which will automatically scuttle a pressurized marine apparatus.

A further object of the invention is to provide a flooding valve assembly for a pressurized marine apparatus which will prevent scuttling until exhaustion of internal pressure.

Briefly, these and other objects of the invention are attained in a flooding valve assembly for scuttling, or sinking, a pressure vessel or other containers having an extensible, spring-restrained nozzle containing a spring-biased ball seal in a flow passage. Prior to pressure vessel deployment, the nozzle is retracted, with the ball biased non-sealingly against the inner opening of the passage. Upon activation of the vessel, internal pressure extends the nozzle, exposing the exterior end of the flow passage and forcing the ball seal against a ball seat to seal the passage. After exhaustion of internal pressure, the bias spring and external water pressure force the ball away from the ball seat, permitting water entry and subsequent sinking of the vessel. The nozzle is maintained in the extended position by the restraining ring spring.

BRIEF DESCRIPTION OF THE DRAWINGS

A more complete understanding of the invention and a fuller appreciation of the many attendant advantages thereof will be readily derived by reference to the following detailed description when considered in connection with the accompanying drawings, wherein.

DESCRIPTION OF THE PREFERRED EMBODIMENT

Figure 1:
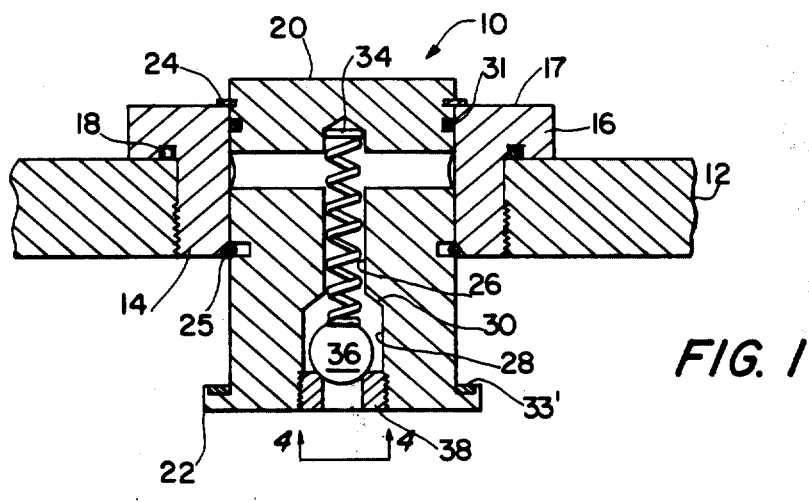
FIG. 1 shows the scuttling valve of the present invention installed in a marine apparatus prior to apparatus deployment.

Referring now to the drawings wherein like reference characters designate identical or corresponding parts throughout the several views, and more particularly to FIG. 1 thereof, the flooding, or scuttling, valve assembly 10 of the present invention is shown installed in a marine apparatus having an internal source of pressure (not shown). Installation of the valve assembly may be by the screw thread engagement between the wall 12 of the marine apparatus and the valve housing 14 as shown in the FIGS., or by any other suitable attachment means.

The valve housing 14 is provided with an outwardly projecting flange 16 on its exterior end, which seats against the exterior surface of the wall 12. A sealing ring 18 in the flange 16 prevents water entry into the marine apparatus. A piston member 20 extends into the interior of the marine apparatus through a central bore in the housing 14, with the interior end portion of the piston having an external circumferential lip 22 which coacts with the housing 14 to prevent complete withdrawal of the piston 20 (note FIGS. 2 and 3). Adjacent the exterior end of the piston is an annular retaining ring 24 which coacts with the exterior surface 17 of the housing 14 to prevent complete retraction of the piston into the marine apparatus.

Figure 2:
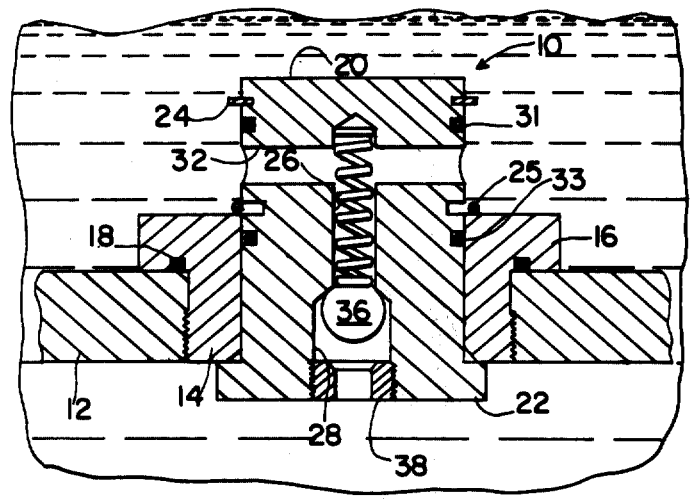
FIG. 2 is similar to FIG. 1, with the valve in the enabled condition.
Figure 3:
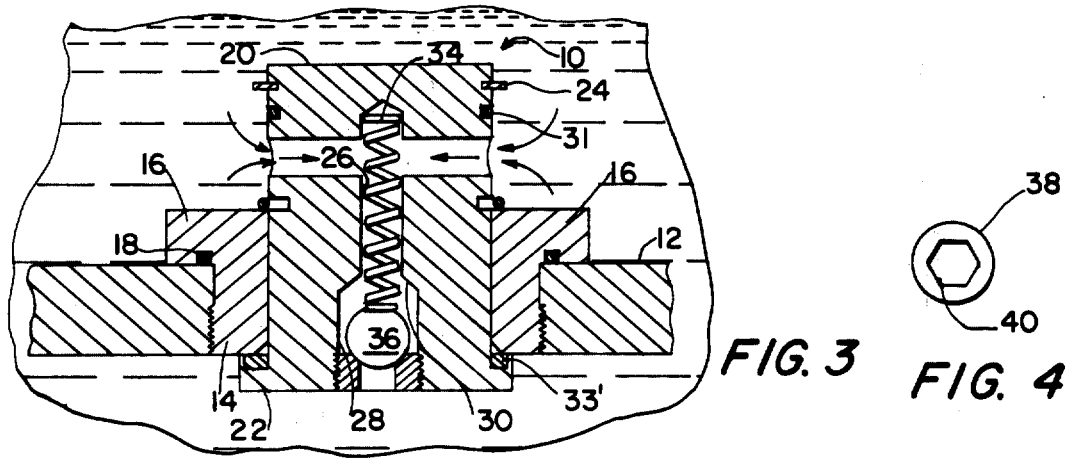
FIG. 3 shows the operative condition of the valve.

A restraining spring 25 within a groove on the piston member 20 coacts with a chamfered surface on the interior end portion of the housing 14 to maintain the piston in the retracted position of FIG. 1, and biases against the unchamfered, outer end surface 17 of the valve housing 14 to maintain the piston in the extended position shown in FIGS. 2 and 3. Spring 25 is calibrated to more accurately establish the pressure response level of the piston, and of course other spring biased detents, such as detent balls, could be substituted.

Longitudinally spaced adjacent the retaining ring 24 is a sealing ring 31 which prevents entry of water into the marine apparatus and the possible leakage of fuel, fluid pressure, etc. therefrom when the piston 20 is in the retracted position (FIG. 1). A secondary fluid seal 33 may be used to confine fuel, fluid pressure, etc. within the apparatus when the piston 20 is extended as shown in FIGS. 2 and 3. This secondary seal may be similar to the seal 31 and be positioned longitudinally inward of the restraining spring 25, as shown in FIG. 2, or be an annular seal 33' positioned within a groove in the annular lip 22 of the piston, as alternatively shown in FIGS. 1 and 3. Use of the annular seal 33' would require precision finish and fit of the mating surfaces of the valve housing 14 and the piston's annular lip, and would therefore be more expensive than the use of two seals similar to 31.

Figure 4:
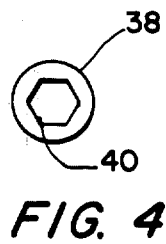
FIG. 4 is a view of the orifice ring as seen along the line 4—4 of FIG. 1.

A central, longitudinal bore 26 extends from the interior end of the piston 20 for substantially the length of the piston. A coaxial counterbore 28 of larger diameter extends into the piston and terminates in a tapered ball seal 30. Approximate the exterior end portion of the piston 20 is a transverse bore 32, extending orthogonally to the central bore 26 and intersecting therewith to provide a flow passage for the entry of water during scuttling of the marine apparatus (FIG. 3). Positioned within the central bore 26 is a weak bias spring 34, one end of which biases a valve ball 36 received within the counterbore 28 and maintained therein by an orifice ring 38. The ring is centrally perforated to provide an orifice 40 of an appropriate shape to prevent sealing of the coaxial counterbore 28 by the ball 36, such as the hexagonal-shaped orifice shown in FIG. 4.

By way of illustration only, the operation of the scuttling valve will be described as installed on a marine flare which utilizes an internal pressure source to pressurize the fuel. The valve is equally valuable in other applications having a source of internal pressure. The operative sequence of the scuttling valve may be clearly seen from FIGS. 1-3. During storage, handling, and pre-deployment of the flare or other marine apparatus incorporating the valve assembly 10, the piston 20 is fully retracted into the apparatus, with the retaining ring 24 abutting the outer, end surface of the housing 14 (FIG. 1). The restraining spring 25 maintains this position, and the spring 34 biases the ball 36 non-sealingly against the orifice ring 38.

Subsequent to deployment, release of pressure within the marine apparatus to initiate the flare extends the piston member 20 outwardly to expose the transverse bore to the surrounding water, with the annular lip 22 of the piston in abutment against the interior end surface of the valve housing 14. Note FIG. 2. It is understood, of course, that the scuttling valve would be appropriately located on the marine apparatus so that the valve is submerged when the apparatus is deployed. Also, the valve may be installed on the marine apparatus so as to be flush with the surface thereof and reduce any protuberances. Internal pressure forces the ball against the ball seat 30 to preclude release of pressure through the central bore 26 and the transverse bore 32. This pressure is also sufficient to prevent water entry through these passages during operation of the marine apparatus.

After the fuel has been consumed and the flare extinguished, the reduction of internal pressure permits the bias spring 34 to force the ball 36 in non-sealing engagement against the orifice ring 38, allowing water to flow through the bores 32 and 26. The non-sealing seating of the ball permits entry of the water through the ring into the interior of the marine apparatus and the subsequent sinking thereof.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A valve assembly for controlling the entry of fluid into a controlled volume comprising:
   a valve housing attachable to a surface defining the controlled volume;
   a piston member slidably positioned within said housing and having a flow passage therein, said member in fluid communication with the controlled volume; and
   a ball valve within said flow passage and movable between a first, non-sealing position and a second, fluid sealing position,
   said piston member responsive to pressure within the controlled volume to move outwardly within said housing to place said flow passage in fluid communication with the ambient environment, and
   said ball valve responsive to pressure within the controlled volume to move from said first position to said second position to seal the controlled volume, and returning to said first position upon removal of pressure to permit entry of fluid into the controlled volume.

2. The valve assembly of claim 1 further comprising a spring within said flow passage to bias said ball valve into said first position.

3. The valve assembly of claim 2 further comprising a second flow passage in said piston member and intersecting with said flow passage.

4. The valve assembly of claim 3 wherein said piston member is provided with:
   a first stop means coacting with said housing to define a first longitudinal position of said piston member whereby the end portion of said piston member distal from the controlled volume is substantially flush with the exterior surface of said housing; and
   a second stop means coacting with said housing to define a second longitudinal position of said member whereby the end portion of said piston member distal from the controlled volume extends from the exterior surface of said housing to place said flow passages in fluid communication with the ambient environment.

5. The valve assembly of claim 4 wherein said piston member is further provided with restraining means to maintain said member in said first and said second longitudinal positions.

6. The valve assembly of claim 5 wherein said flow passage is provided with a perforated member to receive said ball valve in a non-sealing engagement in said first position of said ball valve.

7. The valve assembly of claim 6 wherein said flow passage is further provided with a ball seat to receive said ball valve in a fluid sealing engagement in said second position of said ball valve.

8. In combination with a submersible marine apparatus having an internal volume and a source of pressure within the volume, a valve assembly to control automatic flooding of the volume comprising:
- a piston member movable to a position extending from the surface of said apparatus in response to a pressure signal within said internal volume;
- a flow passage within said piston member to provide fluid communication between said internal volume and the ambient environment surrounding said apparatus when said piston member is in the extended position; and
- a ball valve movable within said flow passage between a first, non-sealing position and a second, fluid sealing position,
- said valve being displaced from said first position to said second position in response to a pressure signal within said internal volume, and returning to said first position upon release of the pressure signal to permit entry of water into said volume.

9. The combination of claim 8 further comprising a spring within said flow passage to bias said ball valve into said first position.

10. The combination of claim 9 wherein said piston member is provided with restraining means to maintain the member in the extended position.

11. The combination of claim 9 wherein said piston member is provided with stop means coacting with said apparatus to define a first longitudinal position with said member retracted within said apparatus and a second longitudinal position extending from said apparatus.

12. The combination of claim 10 wherein said flow passage is provided with a perforated member to receive said ball valve in the non-sealing position and a ball seat to receive said ball valve in the fluid sealing position.

* * * * *